United States Patent [19]
Watanabe et al.

[11] Patent Number: 5,241,149
[45] Date of Patent: Aug. 31, 1993

[54] FOOD PACKING BODY FOR HEAT AND MICROWAVE TREATMENT

[75] Inventors: Masato Watanabe; Hideyuki Takahashi; Masao Kinoshita, all of Tokyo, Japan

[73] Assignee: Mitsubishi Gas Chemical Company, Inc., Tokyo, Japan

[21] Appl. No.: 775,039

[22] Filed: Oct. 11, 1991

[30] Foreign Application Priority Data

Oct. 15, 1990 [JP] Japan .................. 2-273319
Oct. 15, 1990 [JP] Japan .................. 2-273320

[51] Int. Cl.$^5$ .............................................. H05B 6/80
[52] U.S. Cl. ................... 219/10.55 E; 219/10.55 F;
219/10.55 M; 99/DIG. 14; 426/107; 426/113;
426/234; 426/243; 428/35.2; 428/35.4;
206/484; 206/204
[58] Field of Search .............. 219/10.55 E, 10.55 F,
219/10.55 M; 426/107, 113, 234, 243, 124;
99/DIG. 14; 428/35, 35.2, 35.4; 264/284;
252/437, 439, 440; 206/204, 484, 484.1, 484.2

[56] References Cited

U.S. PATENT DOCUMENTS

| | | | |
|---|---|---|---|
| 3,770,122 | 11/1973 | Thiele | 206/484 |
| 4,127,503 | 11/1978 | Yoshikawa et al. | 252/439 |
| 4,192,773 | 3/1980 | Yoshikawa et al. | 426/124 |
| 4,421,235 | 12/1983 | Moriya | 428/35 |
| 4,485,133 | 11/1984 | Ohtsuka et al. | 426/124 |
| 4,579,223 | 4/1986 | Otsuka et al. | 206/204 |
| 4,657,610 | 4/1987 | Komatsu et al. | 426/124 |
| 4,667,814 | 5/1987 | Wakamatsu et al. | 206/204 |
| 4,814,124 | 3/1989 | Aoyama et al. | 264/284 |
| 4,856,650 | 8/1989 | Inoue | 206/204 |
| 4,939,332 | 7/1990 | Hahn | 219/10.55 E |
| 4,996,068 | 2/1991 | Hatakeyama et al. | 426/234 |

FOREIGN PATENT DOCUMENTS

| | | |
|---|---|---|
| 63-082967 | 4/1988 | Japan . |
| 63-087964 | 4/1988 | Japan . |
| 63-087965 | 4/1988 | Japan . |
| 63-087966 | 4/1988 | Japan . |

OTHER PUBLICATIONS

Patent Abstract of Japan; No. JP 1045278; "Package of Gas Absorber", Hiroshi Ueno (publication date Feb. 17, 1989).

Primary Examiner—Bruce A. Reynolds
Assistant Examiner—Tu Hoang
Attorney, Agent, or Firm—Leydig, Voit & Mayer

[57] ABSTRACT

Food is contained in a container made from packing materials with an oxygen permeability of 200 ml/m$^2$. 24Hr·atm, an oxygen absorber which has a microwave-proof layer with film thickness of 5-20 μm on at least one side and also air-permeable packing material on at least one side, whose surface with the air-permeable packing meterial is permeable to air with a water vapor permeability of 10-3,000 g/m$^2$. 24Hr·atm. The oxygen absorber packet is fixed in said container. Under these conditions, it becomes possible to perform both heat treatment and microwave treatment of the food contained therein.

23 Claims, 3 Drawing Sheets

FOOD PACKING BODY FOR HEAT AND MICROWAVE TREATMENT

FIELD OF THE INDUSTRIAL APPLICATIONS OF THE INVENTION

This invention relates to a food packing body for heat and microwave treatment which allows both heat treatment and cooking by a microwave oven, and more particularly, this invention relates to a food packing body for heat and microwave treatment which is able to hold food in a sealed container together with an oxygen absorber packet in order to perform the heat treatment of the food at 80°-150° C. and to cook it in the microwave oven after storage.

DESCRIPTION OF THE RELATED ART

Recently, the use of oxygen absorbers has established a technology to protect food from oxidation or putrefaction by bacteria and to preserve the freshness of food for a long period of time, and this technology has been expanding to be used with regard to various foods.

Preservation technology using oxygen absorbers involves sealing and packing the food with an oxygen absorber and keeping the inside of the packed container in an anaerobic condition, thereby protecting the food from the oxidation of its fat element or discoloration, preserving the flavor, and to avoiding damage from insects or propagation of aerobic bacteria, etc., and maintaining the quality of the food.

An oxygen absorber is composed of one or more substances which have the property of absorbing oxygen. This oxygen absorber has usually been inserted into a small packet which is air-permeable. Conventionally, various kinds of oxygen-absorbing substances have been suggested as contents of the oxygen absorber packet. However, in consideration of safety, efficiency of oxygen absorption and cost, substances containing iron powder as its primary agent have been used in many cases. Also, such materials as those laminating and binding paper and porous polyethylene film, and those laminating and binding perforated plastic film, paper and porous polyethylene film have been used to make the air-permeable packet.

However, it has been pointed out that, when preserving food in a sealed package with an oxygen absorber, deterioration of the quality of food cannot be prevented and advances even in the absence of oxygen, due to deterioration by anaerobic bacteria or enzymes and the aging of starch.

On the other hand, another approach to long-term food preservation is preserving food after heat treatment. In this procedure, heat sterilization is performed on the food sealed in packing materials at temperatures of, for example, 80°-150° C. The sterilization of microorganisms which can cause putrefaction makes it possible to preserve the food for a long period of time.

However, before the heat-treated food is delivered to customers via distribution channels and consumed, the effects of oxygen which was dissolved in the food, or which remained in the container, or which penetrated the container during the preservation period, could not be avoided and caused oxidation of fat contained in the food, discoloration of the food and the like.

Particularly, when oxygen exists at the time of the food's heat treatment, the degree of alteration by oxidation of the food becomes great.

For the purpose of resolving both defects in the technology described above, a new technology combining an oxygen absorber and heat treatment was suggested in Japanese Patent Laid-Open Publication (kokai) No. 63-219359 and U.S. Pat. No. 4,856,650, which disclosed the technology for preserving the food by jointly using the oxygen absorber and the heat treatment and to use heat-proof, oilproof and waterproof materials as air-permeable packing materials forming the oxygen absorber packet.

Moreover, with the prevalence of household microwave ovens, it has become general practice to use a microwave oven to perform heat treatment on, and thaw the food packet just as it is packed.

In the preservation technology using an oxygen absorber, a microwave-proof oxygen absorber packet with an improved oxygen absorber and an improved air-permeable packing material was suggested in order to respond to the above situation. (Refer to Japanese Patent Laid-Open Publication (kokai) No. 63-82967, Japanese Patent Laid-Open Publication (kokai) No. 63-87964, 63-87965 and 63-87966, Japanese Patent Laid-Open Publication (kokai) No. 2-413, and U.S. Pat. No. 4,996,068.)

In addition to the foregoing, since a great number of heat treated food packets or heat sterilized food packets have been sold recently, it has generally become popular to heat and cook these food packets by microwave ovens without opening them.

In summary, food preservation technology using oxygen absorbers, long-term preservation technology for heat treated (or retort) food and cooking food with microwaves has become popular. It has become general practice to contain the food in a sealed package with an oxygen absorber, to treat it by heat in order to preserve it until it is delivered to consumers via distribution channels, and finally to have the consumers cook the food using a microwave oven on the food packet containing the oxygen absorber packet without opening it.

However, the following inconveniences occurred with respect to the technology disclosed in the above references when the oxygen absorber packet in the food packing body was exposed to both heat treatment and microwave irradiation:

(1) When the oxygen absorber packet disclosed in Japanese Patent Laid-Open Publication No. 63-219359 and U.S. Pat. No. 4,856,650 was used, most of the microwaves permeated through the packing material of that oxygen absorber packet and were absorbed by its contents, and accordingly too much current and heat were generated in the contents of the oxygen absorber packet, thereby burning the packing materials, or bursting the packing materials under the pressure of the moisture contained in the contents which rapidly heated, vaporized and expanded, and contaminated the food, with the oxygen absorber composition which overflowed out of the packet.

(2) When the oxygen absorber packet disclosed in Japanese Patent Laid-Open Publication (kokai) No. 63-82967, Japanese Patent Laid-Open Publication (kokai) No. 63-87964, 63-87965 and 63-87966, Japanese Patent Laid-Open Publication (kokai) No. 2-413 and U.S. Pat. No. 4,996,068 was used, during the heat treatment (or retort), the vapor from the food permeated through open pores of the oxygen absorber packet, causing the deterioration of the ability of its contents to absorb oxygen. Furthermore, the high temperature during heating caused the packet to shrink, the case of the packet containing the oxygen absorber contents to break, and the oxygen absorber contents to flow out of the case and into the food.

(3) In the above cases, unless the heat treatment was performed after completely eliminating the oxygen in the food packing body, the heat treated food was oxidized or discolored by the oxygen existing in the container. Particularly, problems occurred involving the quantity of active ingredients in the food such as the decrease of vitamins due to oxidation.

(4) Also when combining the technologies related to the oxygen absorber packet disclosed in references (1) and (2), the inconveniences explained below occurred, and it seems that the oxygen absorber had almost no practical use.

That is, unless the water vapor permeability of the packing materials for the oxygen absorber packet is strictly controlled, the vapor permeates through open pores of the oxygen absorber packet during the heat treatment, causing the inconveniences described in (1) and (2). Furthermore, not only do the packing materials for the oxygen absorber packet suffer heat contraction and become defective in appearance, but also, the sealing part of the oxygen absorber packet peels off, and the contents flow into and contaminate the food in the container. Depending on the position and the angle of the oxygen absorber packet in the food packing body, when cooking the food in a microwave oven, sparks were produced at the time of microwave irradiation which burned the food.

SUMMARY OF THE INVENTION

The present invention resolves the problems indicated in (1) through (4), and its purpose is to provide a superior food packing body with regard to safety and nutrition, with an oxygen absorber packet that does not shrink or break, with an oxygen absorber that does not come out of the packet, and which does not produce sparks which burn the food when exposed to microwave irradiation or conventional cooking with heat.

Regarding the improvement of the oxygen absorber packet, the inventor has investigated and completed the present invention by concentrating on the development of a packing material through which a significant amount of vapor cannot permeate during the heat treatment and which has an appropriate water vapor permeability and which is resistant to microwaves.

In other words, the present invention relates to a food packing body which consists of a container which includes packing material with an oxygen permeability of 200 ml/$m^2$·24Hr·atm or less and an oxygen absorber packet made from a microwave-proof layer or film layer with a film thickness of 5–20 μm on at least one side of the packet and, at the same time, air-permeable packing material on at least one side of the packet, which is fixed in the container. The surface of the packet including the air-permeable packing material should have a water vapor permeability of 10–3,000 g/$m^2$·24Hr·atm, preferably 20–2,000 g/$m^2$·24Hr·atm, or most preferably 30–1,000 g/$m^2$·24Hr·atm, and further within which contains an oxygen absorber, and which thereby enables both heat treatment and microwave treatment of food contained within this packet.

The air-permeable packing material is used on either both or one side of the oxygen absorber packet. When the air-impermeable packing material is used on only one side of the oxygen absorber packet, air-permeable packing material is used on the other side. The microwave-proof film layer is also used on either both or one side of the oxygen absorber packet. When the microwave-proof layer laminates with the air-permeable packing material, an air-permeable microwave-proof layer is used, and when the microwave-proof layer laminates with air-impermeable packing material, an air-impermeable microwave-proof layer or an air-impermeable layer is used.

In one preferred embodiment of the present invention, the air-permeable packing material is used on both sides of the oxygen absorber packet and the air-permeable microwave-proof layer is laminated to at least one side of the air-permeable packing material on the oxygen absorber packet. In another preferred embodiment, the air-permeable packing material is used on one side of the oxygen absorber packet while the air-impermeable packing material is used on the other side, and the microwave-proof layer laminates with at least either the air-permeable packing material or the air-impermeable packing material, and an air-permeable microwave-proof layer laminates with the air-permeable packing material, an air-impermeable microwave-proof layer or an air-permeable microwave-proof layer laminates with air-impermeable packing material.

In order to make the packing material and the microwave-proof layer of the oxygen absorber packet air-permeable, they should be produced so as to have multiple pores.

In the present invention, the microwave-proof layer shields the microwaves, even if it is irradiated by either reflection or absorption, but in any case the microwave energy decays so as not to excite the contents. The existence of a microwave-proof layer in the oxygen absorber packet prevents the heating of the oxygen absorber which is contained in the packet, and therefore the packet never breaks.

The packing material with the microwave-proof layer uses electrically conductive packing material as well as material to which electrical conductivity has been applied through various methods. The materials and some of the methods used include: metal foils including gold, silver, aluminum, iron, etc.; metal nets; plastic films with metal membrane of silver, copper, etc. formed by chemical reduction; layers with metal membrane formed by vacuum evaporation, etc.; layers on which electrically conductive coating, plating, etc. is done; and plastic films with metal powder, grains, fibers, etc. added, dispersed, or contained. Regarding these electrically conductive layers, when using the metal foils or when producing various metal membranes, aluminum or metals containing aluminum as its main element, i.e. a metal containing aluminum as its main element with a small quantity of other metals added to provide safety, are preferable with regard to safety when used for food, pharmaceuticals and the like. The use of aluminum foil with a film thickness of 5–20 μm is preferable in order to keep the percent of shrinkage during the heat treatment within limits, to maintain rigidity and other suitable properties of packing materials, and to facilitate adhesion during lamination with other films. By using an aluminum foil, packing the oxygen absorbers using packaging machines can be facilitated.

The percent of shrinkage during the heat treatment is preferably five percent or less, or most preferably two percent or less at a temperature of 120° C.

These electrically conductive layers can be located anywhere within the outermost or middle layers. The microwave-proof layer does not have to be used on both sides of the oxygen absorber packet but should be used on at least one side of the oxygen absorber packet. When the microwave-proof layer is used on one side of the oxygen absorber packet, microwaves are to be irradiated on the surface having the microwave-proof layer.

The microwave-proof layer can laminate with air-permeable packing materials and also air-impermeable packing materials. When the microwave-proof layer laminates with the air-permeable packing material, an air-permeable microwave-proof layer is used. When the microwave-proof layer laminates with the air-impermeable packing material, an air-impermeable microwave-proof layer is used.

All the packing materials known and used for the conventional oxygen absorber packet can be used as packing materials for the new oxygen absorber packet. For example, one or more materials can be selected out of the following: a polyester film, a polyethylene film, paper, a microporous film, and a waterproof non-woven fabric. Furthermore, it is preferable for the air-permeable material to have a waterproof layer which is impermeable to water but not to water vapor under normal pressure which is approximately one atm.

The following combinations can be listed as the lamination of the microwave-proof layer and the air-permeable packing materials: layers which are made by laminating and binding the laminated and bound layers of porous polyester film, porous polyethylene, porous aluminum foil and porous polyethylene to the laminated and bound layers of paper and porous polyethylene; layers made by putting these layers together laminating and binding or heating and binding only the fringes of them; layers which are made by laminating and binding the laminated and bound layers of porous polyester film, porous polyethylene, porous aluminum foil and porous polyethylene to microporous films or waterproof non-woven fabrics; layers which are made by laminating and binding the laminated and bound layers of porous polyester film, porous polyethylene, porous aluminum foil and porous polyethylene to the laminated and bound layers of micro-porous film or waterproof non-woven fabric and porous polyethylene, or by putting these layers together laminating and binding or heating and binding only the fringes of them; layers which are made by laminating and binding the laminated and bound layers of porous aluminum foil and porous polyethylene to micro-porous film or waterproof non-woven fabric; or layers which are made by laminating and binding the laminated and bound layers of porous aluminum foil and porous polyethylene to the laminated and bound layers of microporous film or waterproof non-woven fabric and porous polyethylene, or by putting these layers together laminating and binding or heating and binding only the fringes of them.

Combinations such as the following can be listed as the laminated material used for the microwave-proof layer and the air-impermeable packing material: non-porous material which is the same materials used for the air-permeable packing material; laminated and bound layers of non-porous aluminum foil and non-porous polyethylene; laminated and bound layers of non-porous polyester film, non-porous polyethylene, non-porous aluminum foil and non-porous polyethylene; or the laminated and bound layers of non-porous aluminum foil and laminated and bound layers of non-orous aluminum foil and non-porous polypropylene.

When the microwave-proof layer and the air-impermeable packing material is laminated and used on one side of the oxygen absorber packet and the air-permeable packing material is used on the other side of the packet, combinations such as the following can be listed as the laminated material of the air-permeable packing material: laminated and bound layers of porous polyester film, porous polyethylene, paper and porous polyethylene; laminated and bound layers of porous polyester film, porous polyethylene, micro-porous film or waterproof non-woven fabric, and porous polyethylene; and layers made by laminating and binding laminated and bound layers of porous polyester film, porous polyethylene and microporous film or waterproof non-woven fabric, and the porous waterproof polypropylene. Furthermore, paper used for packing material should preferably be waterproof and oilproof.

In the present invention, a surface of the oxygen absorber packet having air-permeable packing material, i.e., a surface formed solely by air-permeable packing material or formed by laminating air-permeable packing material to an air-permeable microwave-proof layer is permeable to air with the water vapor permeability of 10-3,000 g/m$^2$·24Hr·atm.

The reason for limiting the water vapor permeability to 3,000 g/m$^2$·24Hr·atm or less in the present invention is to maintain the permeation speed of oxygen and moisture necessary to eliminate the oxygen in the food packing body and, at the same time, to prevent the moisture from the food from evaporating during the heat treatment, considerably penetrating into the oxygen absorber packet in significant amount, and thereby dampening the oxygen absorber and deteriorating the ability of the oxygen absorber to absorb oxygen.

The reason for limiting the water vapor permeability to 10 g/m$^2$·24Hr·atm or more is as follows:

When preserving food, food with high moisture content tends to putrefy more easily than food with low moisture content, and a higher speed of oxygen permeation is necessary to maintain the quality of the food. When the surface of the packet has a speed of oxygen permeation corresponding to the above condition, the water vapor permeability is 10 g/m$^2$·24Hr·atm or more. Furthermore, the numerical relation of the speed of oxygen permeation and the water vapor permeability of the air-permeable packing material is not constant but almost proportional.

The water vapor permeability can be adjusted to fall within a certain range by perforating holes in the packing material and the microwave-proof layer, and by adjusting the diameter and/or, interval of the pores and thereby adjusting the total area of the holes as a percentage of the total area of the oxygen absorber packet. For example, the total area of the holes as a percentage of total area is almost proportional to the water vapor permeability. The water vapor permeability can be increased by making the percentage of total hole area a large value, and it is possible to set the percentage of total hole area at 0.8-8% and the water vapor permeability at 10-3,000g/m$^2$·24Hr·atm.

Also, by using the 5-20 μm microwave-proof layer together with the air-impermeable or air-permeable packing material, it is possible to give microwave resistance to the oxygen absorber packet and to minimize the heat contraction of the oxygen absorber packet during the heat treatment as much as possible.

The following three types of packing material used for the oxygen absorber packet can be listed for use in the present invention: (1) a type using the laminated layers of the microwave-proof layer and the air-permeable packing material on both sides of the packet; (2) a type using laminated layers of the microwave-proof layer and the air-permeable packing material on one side of the packet and using laminated layers of air-impermeable microwave-proof layer and air-impermeable packing material on the other side; and (3) a type using air-permeable packing material on one side of the packet and using an air-impermeable microwave-proof layer and an air-impermeable packing material on the other side.

The configuration involving laminated layers of air-impermeable microwave-proof material and air-impermeable packing material on one side of the packet makes it possible to place the packet with the surface without pores facing the food, which is preferable with respect to safety and health.

The configurations described later in FIG. 1 through 3 are in practical use.

Oxygen absorbers in general use are, for example, absorbers containing sulfite, hydrogensulfite, dithionite, ferrous salt, hydroquinone, catechol, gallic acid, resorcinol, pyrogallol, rongalite, ascorbic acid and/or ascorbic acid salt, isoascorbic acid and/or isoascorbic salt, sorbose, glucose, lignin, dibutyl hydroxytoluene or butyl hydroxycyanisole, or absorbers containing metal powder such as iron powder, or further absorbers generating or absorbing carbon dioxide. Among these absorbers, ones containing ascorbic acid and/or ascorbic acid and especially in the present invention, ones containing iron powder with an iron content of 40–99.95 wt. % are preferable.

As for oxygen absorbers containing iron powder as its main agent, metal halide, carrier, powder filler and water-absorbing high molecular composition can also be listed. The carrier holds water when necessary.

Materials including, but not limited to, granular diatomaceous earth, perlite, zeolite, activated alumina, silica gel, activated carbon, activated clay, vermiculite, and bentonite can be listed for the carrier, and materials including, but not limited to, inorganic substances such as zircon sand, aluminun silicate, aluminum hydroxide, soda glass, calcium silicate, calcium carbonate, calcium phosphate, silicon carbide, iron oxide, talc, titanium oxide, magnesia, boron nitride, aluminum nitride, silicon nitride, glass, lead glass, strontium titanate, pottery, granite, marble, shirasu balloons and plaster, and various organic high molecular compounds can be listed for the powder filler.

As the metal halide in the oxygen absorber packet of the present invention, the following substances can be listed: chlorides belonging to the alkali metals such as sodium chloride and potassium chloride; chlorides belonging to the alkaline earth metals such as magnesium chloride and calcium chloride; other various chlorides such as aluminum chloride, ferrous chloride and ferric chloride; bromides belonging to the alkali metals such as sodium bromide and potassium bromide; bromides belonging to the alkaline earth metals such as magnesium bromide and calcium bromide; other various bromides such as iron bromide and nickel bromide; iodides belonging to the alkali metals such as sodium iodide and potassium iodide; iodides belonging to the alkaline earth metals such as magnesium iodide and calcium iodide; and other various iodides such as aluminum iodide, ferrous iodide and ferric iodide. Among these substances the metal chlorides are preferable with regard to the safety and health of consumers, and within these metal chlorides, sodium chloride, magnesium chloride, calcium chloride, ferrous chloride and ferric chloride are particularly preferable.

Food with a moisture content of 8% or more, for which the present invention, is suited involve a high water activity (relative humidity in the packing body sealing the food inside) and when treated with heat, the water vapor pressure within the food packing body increases and a large quantity of moisture is likely to penetrate into the oxygen absorber packet.

For this reason, it is insufficient to limit only the water vapor permeability of the oxygen absorber packet, so it is necessary to limit the amount of metal halide to be contained in the oxygen absorber composition, too.

The role of the metal halide is to draw moisture into the oxygen absorber composition to supply enough moisture to its main agent, i.e., iron powder, as needed for oxygen absorption and to break the oxide skin to accelerate the oxidation and improve the oxygen absorbing speed. However, if the amount of the metal halide is excessive, a great amount of moisture is drawn into the oxygen absorber composition when the humidity is high within the food packing body, and thereby damping stickily the oxygen absorber composition and ceasing the oxygen absorption.

Therefore, in order to correspond to the situation with high humidity within the food packing body, it is necessary to set the maximum limit of the content of the metal halide so as to limit the amount of moisture to be drawn into the oxygen absorber composition. On the other hand, when preserving food under normal temperature, it is required to contain the necessary and minimum amount of metal halide in order to obtain the oxygen absorbing speed needed to maintain the quality of the food and especially to correspond to food with a large moisture content which tends to easily putrefy. In order to meet the above conditions, the content of the metal halide should be 0.05–4.0%, preferably 0.1–3.0%, and more preferably 0.2–2.0%.

A high molecular water absorber or a water absorbing resin can also be contained in the oxygen absorber used in the present invention. Especially during heat treatment under high temperatures and high humidity, high molecular water absorbers and water absorbing resins demonstrate their abilities to absorb water. Acrylic acid polymers, acrylic acid salt polymers and copolymers of these polymers, vinyl alcohol, starch, and other materials can be listed as high molecular water absorbers or water absorbing resin.

The oxygen absorbing properties of the oxygen absorber packet used in the food packing body of the present invention should not be destroyed even when exposed to high temperatures and high humidity during the heat treatment or microwave treatment and should remain intact for a long period of time when preserved under normal temperatures.

In order to function under such severe working conditions, close cooperation between the air-permeable packing material and the oxygen absorber composition jointly composing the oxygen absorber packet is essential, and in order to perform such cooperation, it is preferable to limit the water vapor permeability of the air-permeable packing material to 10–3,000 $g/m^2 \cdot 24Hr \cdot atm$ and to limit the content of the metal halide as a component of the oxygen absorber to 0.05–4.0%.

The container used for the food packing body of the present invention should be made from materials with an air permeability of 200 ml/m²·24Hr·atm or less, and more preferably, of 100 ml/m²·24Hr·atm or less. And, if the container can be completely sealed, it can be used regardless of the form or shape of the container.

However, it is necessary to use a heatproof container that can withstand the temperatures present during heat treatment, and we should be especially cautious when the heat treatment is performed at temperatures of 110° C. or more.

The most simple containers used for the present invention are, but are not limited to, bags or molded containers made of various polyvinylidene coated laminated films such as KON/PE (polyvinylidene coated nylon/polyethylene), KOP/PE (polyvinylidene coated polypropylene/polyethylene) or KPET/PE (polyvinylidene coated polyethylene terephthalate/ polyethylene), KON/CPP (polyvinylidene coated nylon/drawing polypropylene), or those made of laminated films such as EVAL (trade name, by KURARAY CO., LTD.). Such containers are normally sealed using a heat seal.

Moreover, regarding the food packing containers of the present invention, it is preferable not to use those made of materials through which microwaves do not freely pass, for example, those made of the laminated layers of aluminum evaporated film, aluminum foil, etc., since the food which is preserved in the container does not receive effective microwave irradiation. However, the tray-type container can be used if there is no problem in cooking and if the top film is microwave permeable.

In the present invention, the oxygen absorber packet in the food packing container is distanced or isolated from the food.

In order to prevent the food and water drops from adhering to the surface of the oxygen absorber packet when water vapor is rapidly generated during the heat treatment or the microwave irradiation, it is preferable to distance or isolate the food from the oxygen absorber packet.

Also, in the past, when microwave treatment was applied, discharge sometimes occurred from the oxygen absorber composition and entered the food. The inventors have found that, in order to avoid such discharge, it is helpful to fix the oxygen absorber packet contained in the food packing body parallel to the turntable of a microwave oven when the food packing body is placed on the turntable of the microwave oven. That is, the plane which is defined as the flatter surface of the oxygen absorber packet must lie between the food and the microwave source and must be perpendicular to the path of the microwaves. This requirement should be taken into consideration when designing the food packing body in the present invention. There are various methods for isolating the oxygen absorber packet from the food in the food packing body and fixing the oxygen absorber packet parallel to the turntable. For example, the oxygen absorber packet can be fixed with adhesive to the inner side of the top film of the molded container (e.g. tray pack), or an air-permeable film can be attached to the inner side of the top film and then the oxygen absorber packet can be inserted between these two films, or a pocket can be made on the inner side of the top film with an air-permeable film with pores having a relatively large diameter, wherein the oxygen absorber packet could be inserted, or an air-permeable film or a pocket made with air-permeable film could be pasted on one side of the food packing body, wherein the oxygen absorber packet could be inserted.

When using an oxygen absorber packet with a perforated surface on only one side, it is preferable to place the non-perforated surface (the air-impermeable surface) of the oxygen absorber packet facing toward the food.

The food to be contained in the food packing body of the present invention can be listed as those on which sterilization, deactivation of enzyme, and the like are effectively performed by heat treatment, those which can be cooked by microwave irradiation, and those which can supply enough moisture for the oxygen absorber to absorb oxygen.

The following can be listed as examples of the food: miscellaneous cereals such as rice, wheat, gen-soba (buckwheat), etc.; fried foods such as grilled chicken, hamburger steak, chicken nuggets, croquettes, American dog (fried pancake with sausage), bite-sized cutlets, etc.; processed meats such as various fried foods, ham, sausage, etc.; processed seafood or fish-paste products such as roasted fish, fried fish, boiled fish, wrapped and broiled fish, kamaboko, chikuwa, etc.; steamed foods such as gyoza, shu-mai, etc.; Japanese-style confectionery such as manju, dorayaki, kuzumochi, daifuku, abekawa-mochi, amanatto, etc.; Western-style confectionery such as cake, cream puff, sponge cake, baum kuchen, pancakes, etc.; processed cereals such as sekihan, Chinese-style fried rice, maze-gohan, etc.; various noodles such as boiled udon, boiled soba, ki-soba, ki-udon, chow mein, spaghetti, fried udon, etc.; delicacies; seaweeds such as kombu, wakame, etc.; sozai (everyday foods) such as tofu, natto, fish, meat, miso, sliced mochi etc. Among these foods, Japanese-style confectionery, Western-style confectionery, noodles, sliced mochi, miso, fried foods, steamed foods, processed cereals and miscellaneous cereals can be listed as particularly effective foods.

Food preservation using the food packing body of the present invention preserves the taste and nutritional value of the food without any alteration or deterioration. Preservation is remarkably effective with food that contains 1 mg/100 g or more of vitamin C. Examples of taste elements which can be preserved are amino acid related substances such as L-sodium glutamate, L-tricholomic acid, ibotenic acid, etc. nucleic acid related substances such as sodium inosinate, sodium guanidate, sodium uridinate, etc. and organic acid related substances such as succinic acid, sodium citrate, etc. Moreover, examples of vitamins which can be preserved are oil-soluble vitamins such as vitamin A, vitamin E, vitamin F, vitamin K, vitamin D, ubiquinone, etc.; and water-soluble vitamins such as vitamin B1, vitamin B2, vitamin B6, vitamin B12, vitamin C, vitamin L, pantothenic acid, folic acid, biotin, niacin, choline, inositol, etc.

When treating the food packing body of the present invention with heat, the heat treatment may be performed immediately after putting the food and oxygen absorber packet in the container and sealing the container. But if the food contains substances such as amino acids, vitamins, and especially vitamin C, which tend to deteriorate under high temperature and oxygen, it is preferable to perform the heat treatment after making the oxygen content within the food packing body 10% or less, and preferably 2% or less.

Moreover, the alteration by oxidation can be completely avoided by performing the heat treatment after making the oxygen content within the food packing body 0.1% or less and eliminating even dissolved oxygen contained in the food.

The present invention shall be explained with accompanying drawings as follows.

FIG. 1 shows the first example of the oxygen absorber packet (10) used for the food packing body of the present invention.

Both sides of this packet are made of air-permeable packing material which is laminated to a seat which is composed of laminated and bound layers of the films PET (polyester film) (12) and PE (polyethylene film) (14), an electrically conductive film (microwave-proof film) (16), such as aluminum foil and a binding film layer (18) such as PE, and which is perforated by a cold needle, a hot needle; a punching plate, etc. to form permeable pores (20) at appropriate intervals. The seat is made of laminated and bound layers of an air-permeable layer (22) having permeable pores (20), such as paper or microporous film (for example, high density polyethylene non-woven fabric with the trade name, TYVEK, made by E.I. Dupont de Nemours & Co., Inc.) and a heat sealing film layer (24) such as porous PE. Porous PE (24) having permeable pores (26) face each other and the oxygen absorber (25) is contained in a bag made by fusing the fringes of porous PE (24) by heat. Further, since the air-permeable layer (22) already has air-permeability, it is not always necessary to make permeable pores (20). In order to laminate and bind these seats, methods such as dry lamination, squeezing lamination, heat fusion lamination, hot-melt lamination, etc. can be used. FIG. 2 shows the second example of the oxygen absorber packet used for the food packing body of the present invention.

One side of this packet is composed of air-permeable packing material which are layers laminating and binding the seat which is the laminated, bound and perforated layers of PET (12), PE (14), aluminum foil (16) and PE (18), to paper or micro-porous film (22) and porous PE (24). The other side of the packet is composed of air-impermeable packing material which is layers of laminated and bound PET (12), PE (14), aluminum foil (16) and PE (18), all without pores. The porous PE (24) and non-porous PE (30) face each other, and the oxygen absorber is contained in a bag made by fusing the fringes of the porous PE (24) and non-porous PE (30) by heat.

FIG. 3 shows the third example of the oxygen absorber packet used for the food packing body of the present invention.

One side of this packet is made by laminating and binding the seat, which is perforated after laminating and binding PET (12) and PE (14), to micro-porous film (22), and the other side of the packet is made of air-impermeable packing material which is the laminated and bound layers of PET (12), PE (14) and aluminum foil (16) all without pores. The non-porous PE (30) and the micro-porous film (22) face each other and the oxygen absorber is contained in a bag made by fusing the fringes of the non-porous PE (30) and the microporous film (22) by heat.

FIG. 4 shows the first example of the food packing body with tray pack form in the present invention.

The oxygen absorber packet (10) is inserted and fixed at the center of the inner side of the top film (42) of the tray pack (41) which contains the food (40), and the oxygen absorber packet (10) is distanced from and fixed by hot melt adhesive parallel to the food (40) in the tray pack.

FIG. 5 shows the second example of the food packing body with tray pack form in the present invention.

The fringe of the air-permeable film (44) is glued to the inner side of the top film (42) of the tray pack (41), and the oxygen absorber packet (10) is held between the top film (42) and the air-permeable film (44).

FIG. 6 shows the third example of the food packing body with tray pack form in the present invention.

A pocket (46) is formed with air-permeable film inside of the top film (42) of the tray pack (41) and the oxygen absorber packet (10) is held in this pocket.

FIG. 7 is a plan view of FIG. 6.

FIG. 8 shows an example of the food packing body with bag form in the present invention.

A pocket (52) is made by gluing the fringe of an air-permeable film (50) on one side of the food packing bag, (48) which is made of air-impermeable packing material, and the oxygen absorber packet (10) is held in this pocket (52).

It is possible to use different methods for positioning the oxygen absorber packet distanced from and parallel to the food in the food packing body other than the forms described above. When placing the food packing body in a microwave oven, the oxygen absorber packet is perpendicular to the path of the microwaves in order to avoid discharge from the oxygen absorber packet into the food.

The food packing body of the present invention not only preserves the food without alteration or deterioration for a long period of time, which is the original purpose of the invention, but also prevents too much vapor from penetrating through the open pores of the oxygen absorber packet during the heat treatment which would cause the deterioration of its ability to absorb oxygen, and also prevents heat contraction of the material used to make the oxygen absorber packet which could cause contamination of the food. This is accomplished by allowing the seal of the oxygen absorber packet to peel off rather than breaking when the oxygen absorber composition overflows during the heat treatment, and also by making the oxygen absorber packet microwave resistant, by adjusting the water vapor permeability of the oxygen absorber packet, by adding the microwave-proof layer with suitable thickness to the configuration of the packing material, or by adjusting the content of metal halide within the oxygen absorber composition. When using a microwave oven, positioning the oxygen absorber packet in the food packing body perpendicular to the path of the microwaves prevents the food from burning by sparks caused during microwave irradiation.

Therefore, by using the food packing body of the present invention, the food is sterilized safely and healthily during the heat treatment (or retort), the oxygen absorber's ability to absorb oxygen is maintained afterward, and when cooking with a microwave oven at home or in restaurants, we are now able to cook without being concerned about sparks burning the food or about the oxygen absorber packet breaking.

DESCRIPTION OF THE PREFERRED EMBODIMENTS

The present invention shall be explained, using the embodiments as follows.

EMBODIMENT 1

Figure 1:
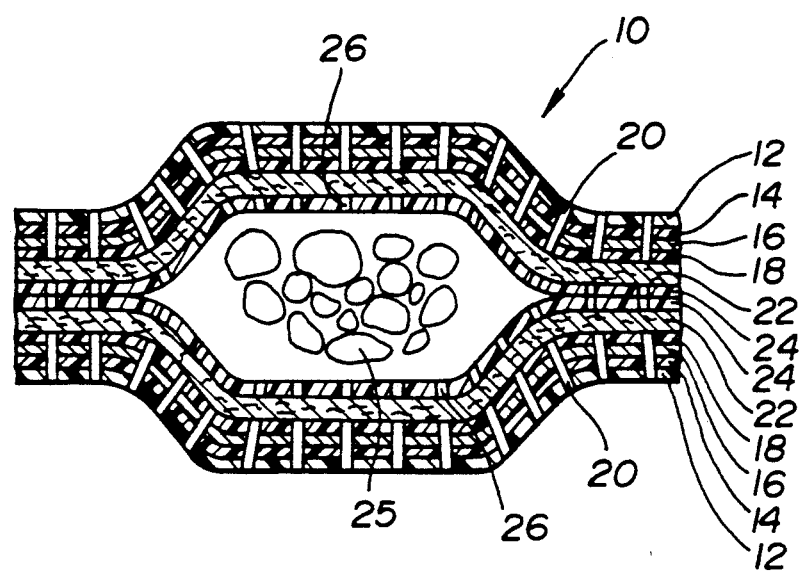
FIG. 1 is a side view of the first example of this invention's oxygen absorber packet.

The oxygen absorber packet (size: 50×50 mm) was made using air-permeable packing material with a water vapor permeability of 400 g/m$^2$·24Hr·atm (whereupon the percentage of total hole area would be 2%) by laminating and binding the laminated, bound and perforated layers of polyester film (thickness: 12 μm), polyethylene film (thickness: 15 μm), aluminum foil (thickness: 9 μm) and polyethylene film (thickness: 15 μm) to the laminated and bound layers of waterproof paper (weight: 40 g/m$^2$) and porous polyethylene film (thickness: 30 μm), and containing 2 g of oxygen absorber in the bag (FIG. 1) which was made by placing two layers of polyethylene film face to face and fusing their fringes by heat.

A substance containing iron powder (98.5 wt.%), NaCl (1.0 wt.%) and activated carbon (0.5 wt.%) was used as the oxygen absorber.

The oxygen absorber packet was bound and fixed with hot-melt adhesive inside and at the center of the bag (size: 180×200 mm) which was made of KON (polyvinylidene coated drawing nylon, thickness: 15 μm)/CPP (polypropylene, thickness: 50 μm), and was sealed in the container together with 250 ml of air and 100 g of meatballs.

After preserving it at a temperature of 5° C. or less for half a day, the heat treatment was performed using a high temperature and pressure steam cooking and sterilizing device (STERI ACE by Nissen CO., LTD., PRS-10-I) at a temperature of 120° C. for 30 minutes.

Moreover, after preserving it at a temperature of 25° C. for 30 days, the food packing body was placed with the oxygen absorber packet parallel to the turntable in the microwave oven (by Mitsubishi Electric Corp., 500W, frequency: 2450MHz) and the food was cooked with microwave irradiation for 3 minutes.

The oxygen content in the food packing body and the appearance of the oxygen absorber packet are indicated in the attached Chart 1 at various stages before and after the heat treatment, after preservation for 30 days and after cooking by microwave oven.

EMBODIMENT 2

Figure 2:
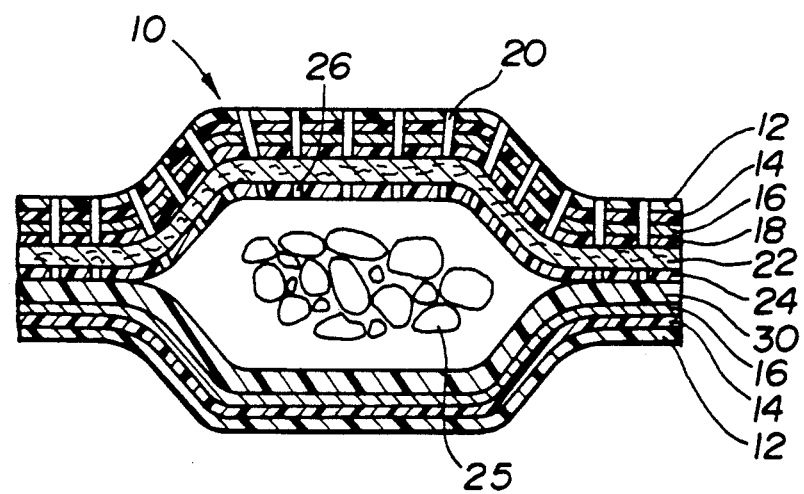
FIG. 2 is a side view of the second example of this invention's oxygen absorber packet.
Figure 3:
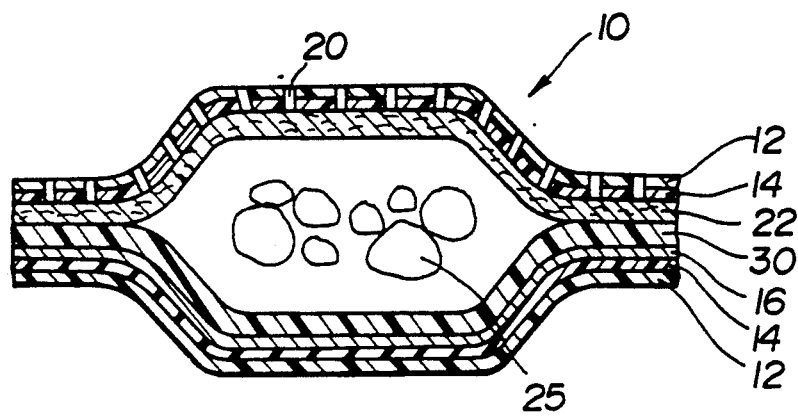
FIG. 3 is a side view of the third example of this invention's oxygen absorber packet.
Figure 4:
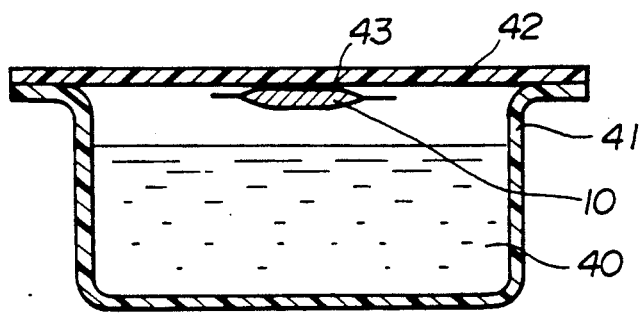
FIG. 4 is a side view of the first example of this invention's food packing body.
Figure 5:
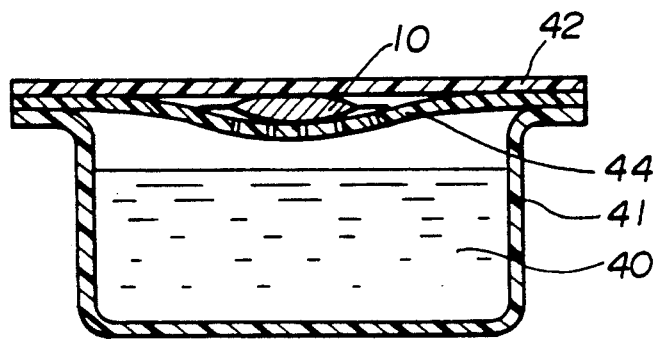
FIG. 5 is a side view of the second example of this invention's food packing body.
Figure 6:
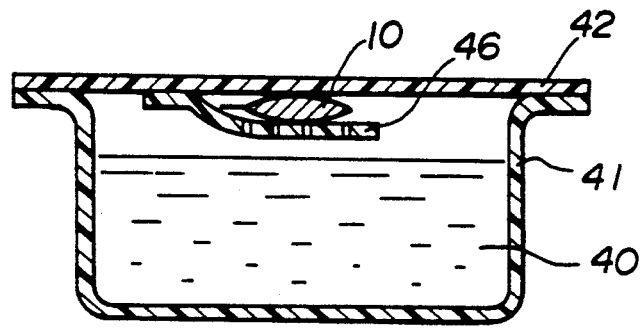
FIG. 6 is a side view of the third example of this invention's food packing body.
Figure 7:
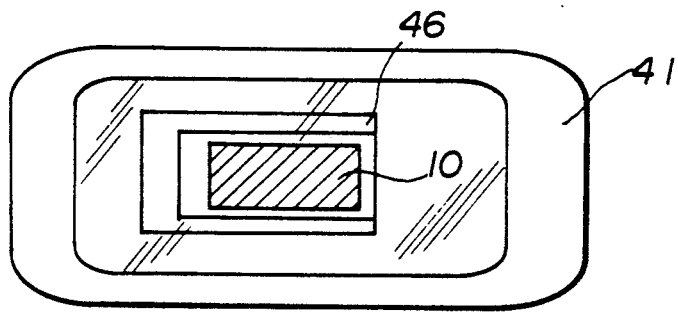
FIG. 7 is a plane view of FIG. 6.
Figure 8:
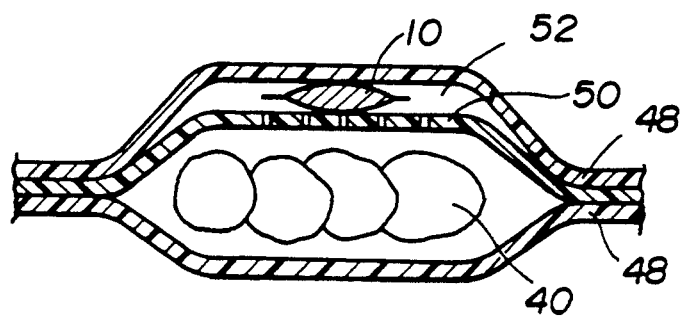
FIG. 8 is a side view of the fourth example of this invention's food packing body.

The oxygen absorber packet (size: 50×50 mm) was made using air-permeable packing material with a water vapor permeability of 400 g/m$^2$·24Hr·atm (whereupon the percentage of total hole area would be 2%) by laminating and binding the laminated, bound and perforated layers of polyester film (thickness: 12 μm), polyethylene film (thickness: 15 μm), aluminum foil (thickness: 9 μm) and polyethylene film (high density polyethylene non-woven fabric by E.I. Dupont de Nemours & Co., Inc., thickness: 200 μm) and porous polyethylene film (thickness: 30 μm) on one side of the packet, and using air-impermeable packing material by laminating and binding polyester film (thickness: 12 μm), polyethylene film (thickness: 15 μm), aluminum foil (thickness: 9 μm) and polyethylene film (thickness: 30 μm) on the other side of the packet. The packet contained 2 g of the same oxygen absorber as used in Embodiment 1 (FIG. 2) and was made by placing the porous polyethylene film and the non-porous polyethylene film face to face and fusing their fringes by heat. An experiment similar the one in Embodiment 1 was carried out.

The oxygen content in the food packing body and the appearance of the oxygen absorber packet are indicated in the attached Chart 1 at various stages before and after the heat treatment, after preservation for 30 days and after cooking by microwave oven.

COMPARATIVE EXAMPLE 1

An experiment similar to the one in Embodiment 1 was carried out using the same oxygen absorber packet and food packing body as Embodiment 1, except that the oxygen absorber contained 5 wt. % of NaCl.

COMPARATIVE EXAMPLE 2

An experiment similar to the one in Embodiment 1 was carried out using the same oxygen absorber packet and food packing body as Embodiment 1, except that the aluminum foil was eliminated from the packing material used for the oxygen absorber packet.

COMPARATIVE EXAMPLE 3

An experiment similar to the one in Embodiment 1 was carried out using the same oxygen absorber packet and food packing body as Embodiment 1, except that the total area of the holes as a percentage of the total outer surface area of the packing materials used for the oxygen absorber packet was increased and the water vapor permeability was made 5,000 g/m$^2$·24Hr·atm.

COMPARATIVE EXAMPLE 4

An experiment similar to the one in Embodiment 1 was carried out using the same oxygen absorber packet and food packing body as Embodiment 1, except that the oxygen absorber packet was enclosed in the container of the food packing body (KON/CPP bag) without binding and fixing the packet with hot-melt adhesive to the inside of the container.

The oxygen content in the food packing body and the appearance of the oxygen absorber packet are indicated in the attached Chart 1 at various stages before and after the heat treatment, after preservation for 30 days and after cooking by microwave oven, with regard to the above comparative examples 1 through 4.

| | Chart 1 | | | | | |
|---|---|---|---|---|---|---|
| | Oxygen content in the food packing body (%) | | | | Appearance and Condition of the oxygen absorber packet | Sensory Analysis after cooked *1 |
| | before treatment | after treatment | after 30 days | after 30 days | after cooked by microwave oven | |
| Embodiment 1 | 3.6 | 0.1 or less | 0.1 or less | normal | normal | 5 |
| Embodiment | 8.5 | 1.2 | 0.1 | normal | normal | 4 |

Chart 1-continued

| | Oxygen content in the food packing body (%) | | | Appearance and Condition of the oxygen absorber packet | | Sensory Analysis after cooked *1 |
|---|---|---|---|---|---|---|
| | before treatment | after treatment | after 30 days | after 30 days | after cooked by microwave | |
| ment 2 | | or less | | | | |
| Comp. Ex. 1 | 3.1 | 0.8 | 1.2 | a great amount of water penetrated inside | a great amount of water penetrated inside | 3 |
| Comp. Ex. 2 | 3.5 | 0.1 or less | 0.1 or less | defective in appearance due to heat contraction | bag broken by burning and the contents scattered | 1 |
| Comp. Ex. 3 | 2.1 | 0.7 | 1.1 | a great amount of water penetrated inside | a great amount of water penetrated inside | 3 |
| Comp. Ex. 4 | 3.6 | 0.1 or less | 0.1 or less | normal | food burnt by sparks | 1 |

*1 5: very delicious
4: delicious
3: average
2: poor
1: inedible

What is claimed is:

1. A food packing body capable of retaining structural integrity when exposed to at least one of heat and microwave treatment, comprising:
   (1) A container made of a packing material with an oxygen permeability of no more than 200 mo/m²·24H·atm for containing food;
   (2) an oxygen absorber packet having at least two sides containing an oxygen absorber and located in said container, comprising a microwave-proof film layer with a film thickness of 5-20 μm on at least one of said two sides of said packet and an air-permeable packing material on at least one of said two sides said packet, said at least one side of said packet with the air-permeable packing material having a water vapor permeability of 10-3,000 g/m²·24H·atm, whereby said packing body allows both heat treatment and microwave treatment of food contained therein.

2. The food packing body for heat and microwave treatment as set forth in claim 1, wherein the water vapor permeability is 20-2,000 g/m²·24Hr·atm.

3. The food packing body for heat and microwave treatment as recited in claim 1, wherein the water vapor permeability is 30-1,000 g/m²·24Hr·atm.

4. The food packing body for heat and microwave treatment as set forth in claim 1, wherein said air-permeable packing material is provided on both sides of the oxygen absorber packet and said microwave-proof film layer is provided with an air-permeability and is laminated to the air-permeable material on at least one side of the oxygen absorber packet.

5. The food packing body for heat and microwave treatment as set forth in claim 1, wherein said air-permeable packing material is provided on one side of the oxygen absorber packet, and an air-impermeable packing material is provided on the other side, and wherein the microwave-proof film layer is laminated to at least one of the air permeable packing materail and the air-impermeable packing material.

6. The food packing body for heat and microwave treatment as set forth in claim 1, wherein the container contains food with a moisture content of at least eight percent and said oxygen absorber comprises iron powder containing 0.05-4.0 wt. percent of metal halide.

7. The food packing body for heat and microwave treatment as set forth in claim 4, wherein said air-permeable packing material comprises a laminated material containing at least one of the following: a porous polyester film, a porous polyethylene film, paper, a microporous film, or a waterproof non-woven fabric, and wherein the air-permeable microwave-proof film layer is porous and electrically conductive.

8. The food packing body for heat and microwave treatment as set forth in claim 1, wherein said microwave-proof film layer is electrically conductive.

9. The food packing body for heat and microwave treatment as set forth in claim 1, wherein the percent of shrinkage of said oxygen absorber packet is no more than about five percent at a temperature of 120° C.

10. The food packing body for heat and microwave treatment as set forth in claim 1, wherein said air-permeable packing material has a waterproof layer which is permeable to steam and impermeable to liquid water at approximately one atm.

11. The food packing body for heat and microwave treatment as set forth in claim 1, wherein said oxygen absorber packet is fixed in a position distanced from the food in said container.

12. The food packing body for heat and microwave treatment as set forth in claim 11, wherein said container is in the form of a tray pack container and said oxygen absorber packet is fixed to the inner surface of the top film of said tray pack container, parallel to said top film.

13. The food packing body for heat and microwave treatment as set forth in claim 1, wherein said oxygen absorber packet is fixed in said container in a position parallel to the turntable of a microwave oven when said food packing body for heat and microwave treatment is cooked in a microwave oven.

14. The food packing body for heat and microwave treatment as set forth in claim 5, wherein the air-impermeable packing material of said oxygen absorber packet is positioned facing toward the food.

15. The food packing body for heat and microwave treatment as set forth in claim 5, wherein said air-permeable packing material comprises a laminated material containing at least one of the following: a porous polyester film, a porous polyethylene film, paper, a microporous film, or a waterproof non-woven fabric wherein said air-impermeable packing material comprises a laminated material containing at least one of the following: a nonporous polyester film or a nonporous film, wherein the air-permeable microwave-proof film layer is porous and electrically conductive, and wherein said air-impermeable microwave-proof film layer is nonporous and electrically conductive.

16. The food packing body for heat and microwave treatment as set forth in claim 6, wherein said food contains at least 1 mg/100 g vitamin C.

17. The food packing body for heat and microwave treatment as set forth in claim 6, wherein the concentration of said metal halide is 0.1-3 wt. %.

18. The food packing body for heat and microwave treatment as set forth in claim 17, wherein the concentration of said halide is 0.2-2 wt. percent.

19. The food packing body for heat and microwave treatment as set forth in claim 8, wherein said electrically conductive layer comprises aluminum.

20. The food packing body for heat and microwave treatment as set forth in claim 1 wherein said oxygen absorber packet has at least two sides and at least one side of said packet being an air-permeable packing material is arranged in said container to be the side closest to a source of microwave radiation.

21. The food packing body for heat and microwave treatment as set forth in claim 5 wherein the permeability of air-permeable packing material is provided by pores in said air-permeable packing material.

22. The food packing body for heat and microwave treatment as set forth in claim 8 wherein said microwave-proof film layer has an exterior surface which is covered by a packing material.

23. The food packing body for heat and microwave treatment as set forth in claim 5, wherein said microwave-proof film layer is permeable to air and laminated to said air-permeable packing material.

* * * * *

UNITED STATES PATENT AND TRADEMARK OFFICE
CERTIFICATE OF CORRECTION

PATENT NO. : 5,241,149

DATED : August 31, 1993

INVENTOR(S) : Watanabe et al.

It is certified that error appears in the above-indentified patent and that said Letters Patent is hereby corrected as shown below:

Claim 1, column 15, line 6, change "H" to --Hr--;

Claim 1, column 15, line 11, after "packet" insert --,--;

Claim 1, column 15, line 13, after "sides" insert --of--;

Claim 1, column 15, line 21, change "H" to --Hr--.

Claim 5, column 16, line 7, change "materail" to --material--.

Claim 15, column 16, line 9, after "nonporous" (second occurrence) insert --polyethylene--.

Claim 16, column 16, line 3, after "g" insert --of--.

Claim 18, column 17, line 3, after "said" insert --metal--.

Signed and Sealed this

Sixteenth Day of May, 1995

Attest:

BRUCE LEHMAN

*Attesting Officer*  *Commissioner of Patents and Trademarks*